May 29, 1923.

V. C. KREUTZ 1,457,037

APPARATUS FOR AND PROCESS OF AUTOMATICALLY PERCOLATING A FRESH
QUANTITY OF COFFEE FOR EACH ONE DRAWN FROM AN URN

Filed Aug. 11, 1921 2 Sheets-Sheet 2

INVENTOR
VERNON C. KREUTZ.
By E B Birkenbeuel
HIS ATTORNEY

Patented May 29, 1923.

1,457,037

UNITED STATES PATENT OFFICE.

VERNON C. KREUTZ, OF PORTLAND, OREGON, ASSIGNOR OF ONE-HALF TO EDWIN B. WHEAT, OF PORTLAND, OREGON.

APPARATUS FOR AND PROCESS OF AUTOMATICALLY PERCOLATING A FRESH QUANTITY OF COFFEE FOR EACH ONE DRAWN FROM AN URN.

Application filed August 11, 1921. Serial No. 491,475.

*To all whom it may concern:*

Be it hereby known that I, VERNON C. KREUTZ, a citizen of the United States, and a resident of Portland, in the county of Multnomah and State of Oregon, have invented a new and useful Apparatus for and Processes of Automatically Percolating a Fresh Quantity of Coffee for Each One Drawn from an Urn, of which the following is a specification.

This invention relates more particularly to means for automatically making drinks of coffee, tea, etc.

The objects of my invention are to provide an exceedingly simple and efficient percolator which will automatically make a new cup of coffee whenever one is drawn from the urn.

Another object is to so construct my device that the oldest grounds are continually being discharged from same as rapidly as new ground coffee is introduced.

Another object is to eliminate the bitter taste produced when subjecting tea or coffee to the action of hot water or steam for too long a period.

Still another object is to eliminate the inconvenience caused by having to stop to make coffee during a rush period or to require the operation of a sufficient number of urns to supply the demand.

Figure 1:
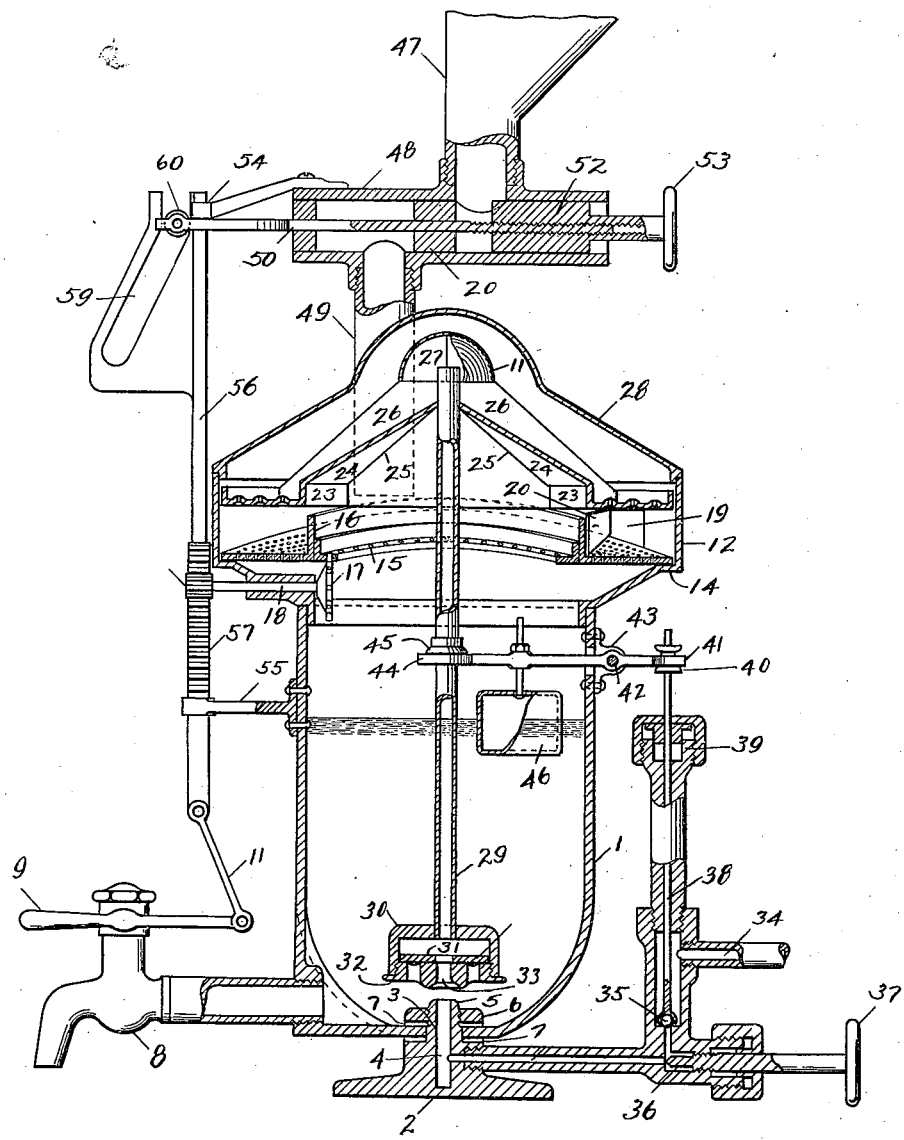
Figure 2:
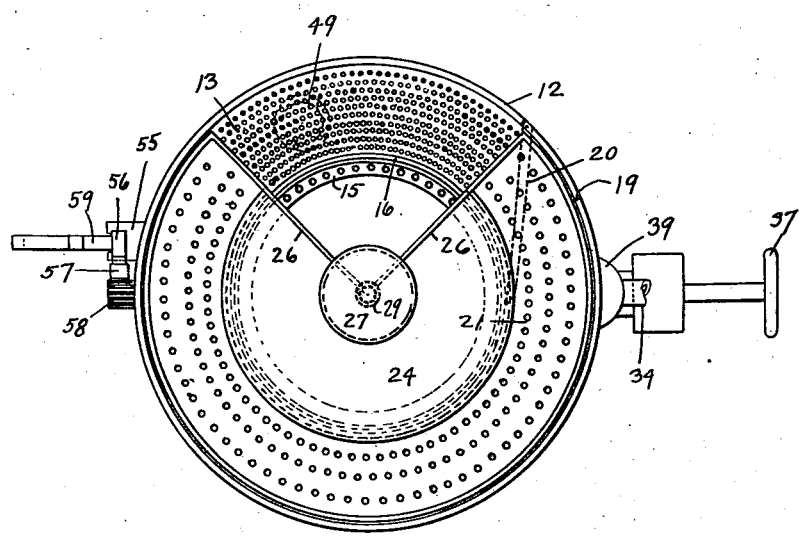

I accomplish these results in the manner set forth in the following specification and illustrated in the figures in the accompanying drawing, in which Figure 1 is a vertical section through the device. Figure 2 is a plan of the device with the cover removed.

Similar numbers of reference refer to the same or similar parts throughout the view.

Referring in detail to the drawing, I have constructed my device of a coffee urn 1 mounted upon a pedestal 2 which has a threaded shank 3 which passes upwardly through the bottom of the urn 1. A hole 4 extends downwardly through the shank 3 and almost reaches the bottom of the pedestal 2 to which heat may be applied. The top 5 of the shank 3 projects slightly above the nut 6 which holds the washers 7 against the bottom of the urn 1.

A coffee-drawing valve 8 is provided at the bottom of the urn 1 and its handle 9 is provided with an arm 10 to which is attached the link 11.

A somewhat funnel-shaped casing 12 rests upon the upper side of the urn 1. The perforated leaching tray 13 rests on the ledge 14 of the casing 12 and is rotated in a manner which will be described later. A gear 15 is secured to the wall 16 and meshes with the pinion 17 on the shaft 18 which journals in the casing 12. A discharge opening 19 is made in the side of the casing 12 through which used grounds are scraped by the plate 20 which extends across the perforated section of the leaching tray 13 from the outside of the wall 16 to one side of the opening 19. The leaching tray 13 preferably slopes away from the loading and unloading side for drainage purposes.

A perforated distributor 21 in the form of a tray has an outer rim 22 which may be supported by the casing 12 and an inner rim 23 which converges upwardly to form an inverted cone 24. The tray 21 and the cone 24 are not complete disks or cones but cover only about three-fourths of the area of the tray 13. The edges 25 of the cone-shaped member 24 are upturned to form the walls 26 upon whose junction is placed the dome-shaped deflector 27. A cover 28 closes the top of the casing 12 when the device is not being cleaned.

Centrally placed in the urn 1 is a percolator stem 29 whose upper end guides in the member 24 and the lower end carries a percolating valve 30 having the usual disk 31 and cap 32. The central hole 33 in the cap 32 is countersunk and is adapted to register with and receive the member 5 when the percolating valve 30 is lowered, which is the case whenever the coffee in the urn is being replenished.

Hot water is admitted from a heater which I have not illustrated and is carried through the pipe 34 to the feed valve 35 whose outlet is controlled by the needle valve 36 which regulates the flow of hot water into the hole 4. The handle 37 permits the ready operation of the regulating valve 36. A stem 38 is attached to the feed valve 35 and passes through the stuffing box 39 and has attached to its upper end a flanged collar 40.

A forked lever 41 is pivoted on the pin 42 in the bracket 43 and engages the collar 40. The inner end 44 of the lever 41 is also forked and receives the stem 29 under its collar 45. A float 46 is attached to the lever 41 between the pin 42 and the end 44 in a manner that the float 46 can be acted upon by the coffee in the urn 1 so that when the desired level is reached the valve 35 will close and the percolating valve will be raised.

It will be understood, of course, that the water is admitted through the valve 36 much slower than coffee can be drawn from the urn through the valve 8 which prolongs the percolating operation in each instance.

Turning now to the coffee feeding device it will be seen that the hopper 47 which contains ground coffee is placed over a horizontal cylinder 48 mounted on the hollow pedestal 49 which opens into the cylinder 48. The open bottom of the pedestal 49 is over the leaching tray 13 between the walls 26. The pedestal 49 is preferably attached to the cover 28. To the stem 50 within the cylinder 48 is attached a plunger 51 and the plunger 52 which threads on the stem 50. A thumb nut 53 enables the operator to adjust the distance between the plungers 51 and 52 and of course the amount of coffee which can fall between same from the hopper 47.

Projecting from the cylinder 48 is a guide 54 and projecting from the urn 1 is a guide 55. In these guides is placed a slide 56 upon which is formed a rack 57 which meshes with the ratchet wheel 58 which preferably has its ratchet on its interior. The pinion 58 is on the shaft 18 and drives the pinion 17. The lower end of the slide 56 is joined to the link 11. A cam slot 59 in the slide 56 engages the roller 60 which is mounted on the stem 50.

The operation of my device is as follows: The valve 36 is opened and hot water allowed to enter the urn until cut off by the valve 35 through the action of the float 46. In entering the urn water must pass up through the stem 29 because the valve 30 has been lowered through the same action of the float 46 after which the water is distributed over the coffee which has been placed upon the tray 13 by actuating the handle 9 the desired number of times before the water has been admitted to the urn—that is—once for each cup of urn capacity. The flavor of the coffee is extracted by the hot water and mixes with the water in the urn. Repouring is accomplished by the liquid in the urn being drawn up through the percolating valve 30 together with the new water which is being admitted from the pipe 34.

When a cup of made coffee is drawn from the valve 8 the rack 57, through the pinions 58 and 17, rotates the tray 13 a short distance. At the same time sufficient ground coffee has been placed upon the tray from the hopper 47, and one cup of water has entered the urn and a portion of the oldest grounds on the tray 13 has been ejected from the hole 19 by the scraper 20.

It will be seen therefore, that whenever a cup of coffee is drawn from the urn that a new one is automatically put in its place within the urn. It will also be observed that when it is desired to empty the urn it is only necessary to close the valve 36 and rotate the thumb nut 53 until the plungers 51 and 52 touch, which will stop the coffee feed as well as the water feed.

In Figure 2 I have indicated the position of a hollow pedestal 49 in dotted lines to show its relation to the tray 13.

I am aware that many forms of percolators and urns have been constructed in the past, I therefore do not intend to cover such devices broadly but only within the limits set forth in the following claims, relating to a machine in which a constant volume of coffee can be maintained within the urn.

What I claim as new is:

1. In a percolator, the combination of an urn, a leaching tray over said urn, means for rotating said tray, a ground coffee introducing device adapted to place coffee upon said leaching tray, a percolating stem slidably mounted within said urn, a float in said urn adapted to raise said stem, a percolating pedestal supporting said urn, and a valve adapted to admit hot water to said percolating pedestal and to be controlled by said float.

2. The combination of an urn, a valve for drawing coffee from said urn, a leaching tray above said urn, means for rotating said tray, a scraper for removing grounds from said tray, a coffee feeding device adapted to place coffee upon said leaching tray, a percolator stem within said urn and having a percolating valve at its lower end, a float within said urn adapted to unseat said percolating valve by raising said stem when the normal coffee level is attained and to seat said percolating valve whenever said coffee level falls, a percolating pedestal supporting said urn, a feed valve for admitting hot water to said pedestal, a needle control valve regulating the flow of water from said feed valve, and a deflector above said percolating stem.

3. A percolator having, in combination, a coffee urn, a percolating stem slidably mounted within said urn, a percolating pedestal supporting said urn, a valve adapted to admit hot water to said pedestal, and a float means within said urn adapted to raise said stem and control said hot water valve.

4. The combination of a coffee urn, a percolating stem slidably mounted within said urn, a percolating pedestal supporting said urn, a valve adapted to admit hot water to said pedestal, a needle valve adapted to regulate the flow of water from said hot water valve into said urn, and a float within said urn adapted to maintain a uniform level of liquid within said urn and to prevent percolation through said stem.

5. The combination of an urn, a valve for drawing coffee from said urn, means for introducing ground coffee into said urn, and means for actuating said coffee introducing means consisting of a slide actuated by said coffee valve said slide carrying a cam adapted to actuate a roller attached to the coffee introducing device.

6. The combination of a coffee urn having a coffee valve attached thereto with a ground coffee introducing device consisting of a hopper having a pair of plungers slidably placed beneath same, with means for adjusting the distance between said plungers, a leaching tray above said urn adapted to receive coffee from said coffee producing device, and means for rotating said leaching tray.

7. The combination of a coffee urn, a percolating stem slidably mounted within said urn, a percolating pedestal under said urn and adapted to register with said percolating stem when the stem is in its lower position, a valve admitting hot water to said pedestal, and a float in said urn adapted to lower said percolating stem upon said pedestal and allow water to pass from said pedestal upwardly through said stem whenever the liquid level in said urn is lowered.

8. The combination of an urn having a coffee valve with a leaching tray above said urn, means for rotating said tray whenever said coffee valve is actuated, a percolating stem and valve adapted to force liquid upwardly over said leaching tray, a distributor over said percolating stem for distributing the liquid evenly over said leaching tray, a float in said urn adapted to stop the flow of liquid through said percolating valve, a valve for admitting hot water into said percolating stem, and means for regulating the flow of said hot water.

9. The combination of a coffee urn mounted on a percolating pedestal with a sliding percolating stem having a percolating valve at its lower end and having a float within said urn adapted to raise said percolating valve from its seat on the bottom of said urn.

10. A method of making coffee consisting of progressively replacing each quantity of coffee withdrawn from an urn with an equal quantity of hot water, leaching sufficient ground coffee with the water to convert the water into liquid coffee and then removing the grounds from further action of heat and moisture after the flavor has been extracted.

VERNON C. KREUTZ.

Witnesses:
EDWIN B. WHEAT,
R. P. MASON.